(12) United States Patent
Fallacaro

(10) Patent No.: US 8,033,417 B1
(45) Date of Patent: Oct. 11, 2011

(54) APPARATUS FOR HOLDING A STACKABLE BUCKET IN PLACE WHEN MIXING MATERIALS THEREIN

(76) Inventor: Thomas A. Fallacaro, Maspeth, NY (US)

( * ) Notice: Subject to any disclaimer, the term of this patent is extended or adjusted under 35 U.S.C. 154(b) by 382 days.

(21) Appl. No.: 12/321,787

(22) Filed: Jan. 26, 2009

(51) Int. Cl.
*B65D 25/20* (2006.01)

(52) U.S. Cl. .......................................... 220/629; 220/908

(58) Field of Classification Search ................. 220/629, 220/908, 628; 248/146
See application file for complete search history.

(56) References Cited

U.S. PATENT DOCUMENTS

| | | | |
|---|---|---|---|
| 4,877,208 A | 10/1989 | Kennard, Jr. | |
| 5,232,188 A | 8/1993 | Troncone | |
| 5,390,812 A * | 2/1995 | Spiro | 220/495.06 |
| 6,361,001 B1 | 3/2002 | Durand | |
| 6,464,184 B1 | 10/2002 | Lytle | |
| 7,178,766 B2 | 2/2007 | Forshee et al. | |
| 7,261,262 B2 | 8/2007 | Dunson | |
| 2005/0230400 A1 * | 10/2005 | Robinson | 220/629 |
| 2007/0076519 A1 | 4/2007 | Kesling | |
| 2008/0224010 A1 | 9/2008 | Roth et al. | |

* cited by examiner

*Primary Examiner* — Stephen Castellano
(74) *Attorney, Agent, or Firm* — Richard L. Miller

(57) ABSTRACT

An apparatus for holding a stackable bucket in place when mixing materials therein which comprises the stackable bucket having a bottom wall joined to a continuous tapered side wall extending upwardly therefrom to form a rim larger than the bottom wall. The stackable bucket can be placed into another stackable bucket for storage when not in use. A pair of rectangular shaped footpads are provided. A mechanism is for pivotally securing each rectangular shaped footpad into the bottom wall of the stackable bucket at an opposite side of the stackable bucket. When the rectangular shaped footpads are pivoted outwardly away from opposite sides of the side wall of the stackable bucket and the bottom wall of the stackable bucket is placed upon a floor, a person will stand upon the pair of rectangular shaped footpads to prevent rotation of the stackable bucket when mixing the materials within the stackable bucket.

2 Claims, 4 Drawing Sheets

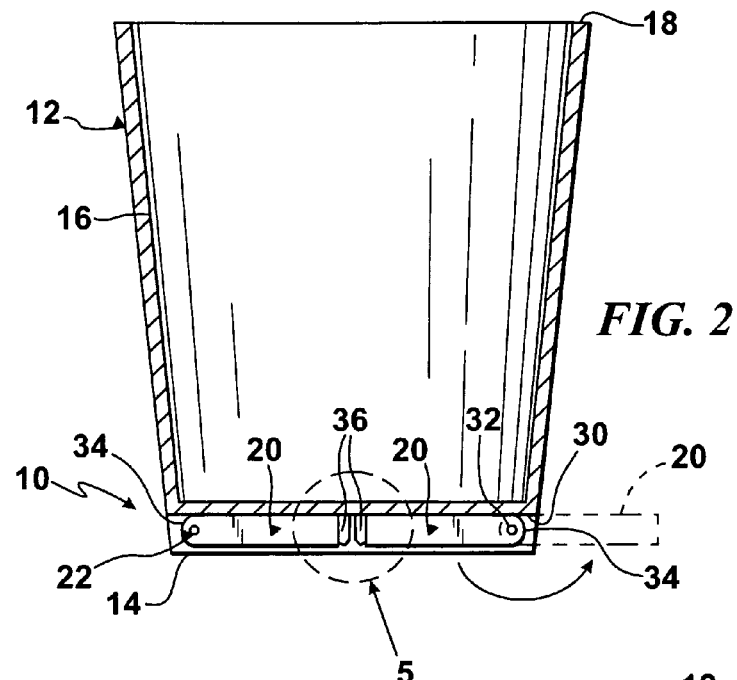
*FIG. 2*
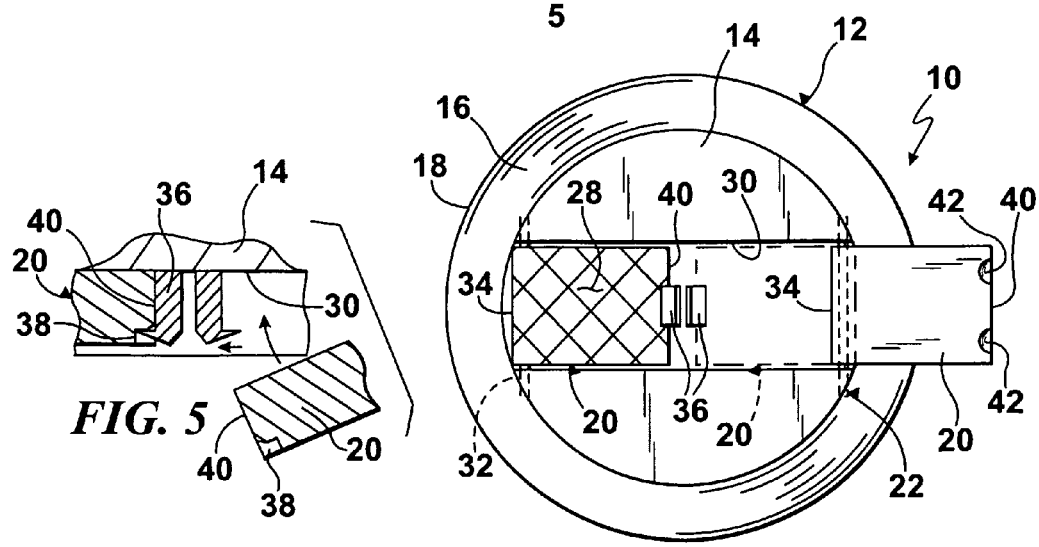
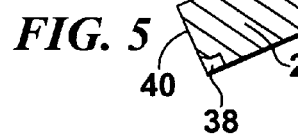
*FIG. 5*
*FIG. 3*

APPARATUS FOR HOLDING A STACKABLE BUCKET IN PLACE WHEN MIXING MATERIALS THEREIN

BACKGROUND OF THE INVENTION

1. Field of the Invention

The present invention relates to a bucket, and more particularly, an apparatus for holding a stackable bucket in place when mixing materials therein.

2. Description of the Prior Art

Numerous innovations for bucket retainers have been provided in the prior art that will be described. Even though these innovations may be suitable for the specific individual purposes to which they address, however, they differ from the present invention.

A FIRST EXAMPLE, U.S. Pat. No. 4,877,208, Issued on Oct. 31, 1989, to Kennard Jr. teaches a support for a mixer bucket which includes a raised platform having a recess shaped to accommodate a mixer bucket. Resistance means are provided in the recess which engage against the bucket to maintain the bucket stationary while the contents of the bucket are being mixed.

A SECOND EXAMPLE, U.S. Pat. No. 5,262,188, Issued on Aug. 3, 1993, to Troncone teaches a jig, for use in supporting a pail during a mixing operation to be carried out within the pail, that includes a support ring which is distorted into an elliptical condition, thus relying on the interfitment of two members of elliptical form to prevent rotation of the pail relative to the jig.

A THIRD EXAMPLE, U.S. Pat. No. 6,361,001 B1, Issued on Mar. 26, 2002, to Durand teaches a container holder for mixing slurry material in a 2½ or 5 gallon bucket. The container holder is formed from a one-piece raised top portion having a centrally disposed aperture allowing insertion of a stirring paddle. Depending from the top portion are two legs that extend downwardly and span the entire height of the bucket to be mixed with foot pads joined at the bottom of the legs extending outwardly therefrom which allow an individual to stand on during the mixing operation.

A FOURTH EXAMPLE, U.S. Pat. No. 6,464,184 B1, Issued on Oct. 15, 2002, to Lytle teaches an apparatus for retaining a canister having an adjustable base and at least one swing member attached to the base and preferably two swing members attached to the base opposite each other. The base further has a spring member disposed thereupon and in contact with the swing member to keep the swing member in a first open position. The swing member has a first end that is rotatably attached to the base via a hinge member and a second end that has a semicircular recess formed therein. The base is adjustable to provide an adjustable range of motion of the swing member with respect to the base. In operation, the apparatus moves from a first open position to a second closed position upon application of a force upon the swing members to retain a canister placed between the swing members. Use of the apparatus results in no temporary movement or constricting of a worker's limbs which can cause imbalance or injury nor requires a second person to stabilize the canister.

A FIFTH EXAMPLE, U.S. Pat. No. 7,178,766 B2, Issued on Feb. 20, 2007, to Forshee et al. teaches a retainer for immobilizing a bucket containing a liquid material, such as paint or other relatively viscous liquids, during mixing the material or to prevent accidental tipping of the bucket, is formed with a ring-like socket within which the bucket is positioned. Laterally-extending wings are formed on the socket. The user stands upon the wings to hold the socket against the ground-supporting surface upon which the socket is supported so as to prevent rotational or other movement of the socket and, consequently, movement of the bucket. The socket is formed of a generally cylindrically-shaped, vertically-axised wall which is tapered inwardly from its upper edge to its lower edge at a sufficient slope to radially inwardly frictionally grip and temporarily lock the bucket within the socket. The outwardly extending wings are of sufficient size for supporting the user's feet on opposite sides of the socket so as to position the user generally above the bucket and enable the user to manually position and hold a mixing device in the bucket while the user's feet clamp the retainer, and consequently, the bucket, against the support surface.

A SIXTH EXAMPLE, U.S. Patent Office Publication No. 20070076519 A1, Published on Apr. 5, 2007, to Kesling teaches an apparatus for stabilizing a container during mixing that includes a base platform, an engagement arm and a brace member. The engagement arm is pivotally attached to the base platform via a hinge. Additionally, the engagement arm includes two components hingably affixed together. The brace member is located opposite the engagement arm and includes a receiving portion directed toward the engagement arm for receiving the container to be stabilized. During mixing, an operator applies a force downward on the engagement arm, generally with a foot, thereby retaining the container between the engagement arm and the brace member. The contents of the container may then be stirred without the operator having to straddle the container.

A SEVENTH EXAMPLE, U.S. Patent Office Publication No. 20080224010 A1, Published on Sep. 18, 2008, to Roth et al. teaches a hold-down for a common pail used in mixing paints, drywall compound, or other applications which has a pair of swing-down, spring-loaded step-pads secured to the base of the pail. There can be a strap for this purpose, with an adjustable draw latch.

It is apparent now that numerous innovations for bucket retainers have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an apparatus for holding a stackable bucket in place when mixing materials therein that avoids the disadvantages of the prior art.

ANOTHER OBJECT of the present invention is to provide an apparatus for holding a stackable bucket in place when mixing materials therein that is simple and inexpensive to manufacture.

STILL ANOTHER OBJECT of the present invention is to provide an apparatus for holding a stackable bucket in place when mixing materials therein that is simple to use.

BRIEFLY STATED, STILL YET ANOTHER OBJECT of the present invention is to provide An apparatus for holding a stackable bucket in place when mixing materials therein which comprises the stackable bucket having a bottom wall joined to a continuous tapered side wall extending upwardly therefrom to form a rim larger than the bottom wall. The stackable bucket can be placed into another stackable bucket for storage when not in use. A pair of rectangular shaped footpads are provided. A mechanism is for pivotally securing each rectangular shaped footpad into the bottom wall of the stackable bucket at an opposite side of the stackable bucket. When the rectangular shaped footpads are pivoted outwardly away from opposite sides of the side wall of the stackable bucket and the bottom wall of the stackable bucket is placed upon a floor, a person will stand upon the pair of rectangular shaped footpads to prevent rotation of the stackable bucket when mixing the materials within the stackable bucket.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a diagrammatic cross sectional view of the present invention per se taken on line 2-2 in FIG. 1, with the footpads folded inwardly;

FIG. 3 is a diagrammatic bottom view taken in the direction of arrow 3 in FIG. 1, with one footpad folded inwardly;

FIG. 5 is an enlarged diagrammatic cross sectional view of the area enclosed in the dotted circle indicated by arrow 5 in FIG. 2;

A MARSHALING OF REFERENCE NUMERALS UTILIZED IN THE DRAWING

Figure 1:
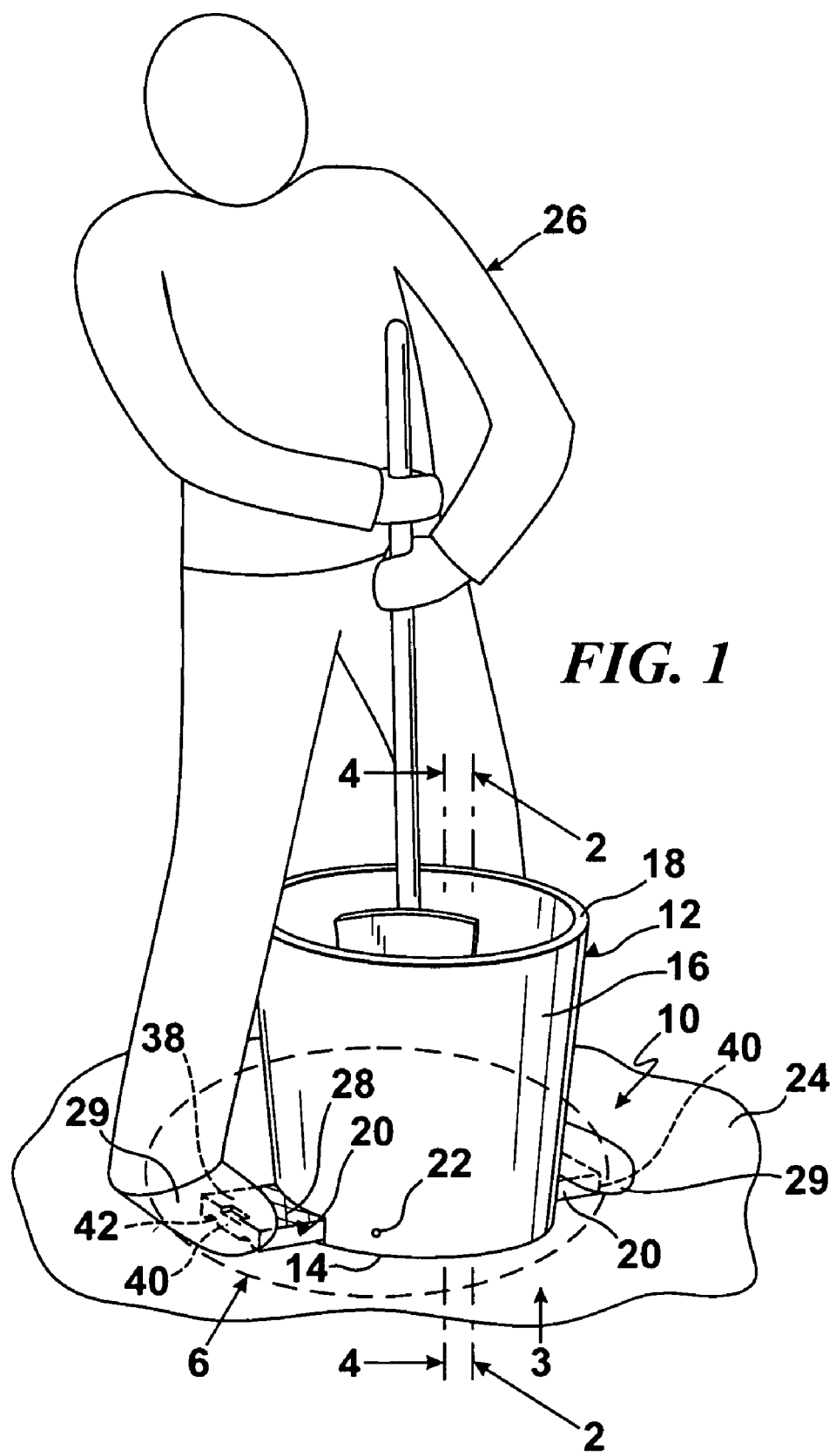
FIG. 1 is a diagrammatic perspective view of an embodiment of the present invention being utilized by a person mixing a product.
Figure 4:
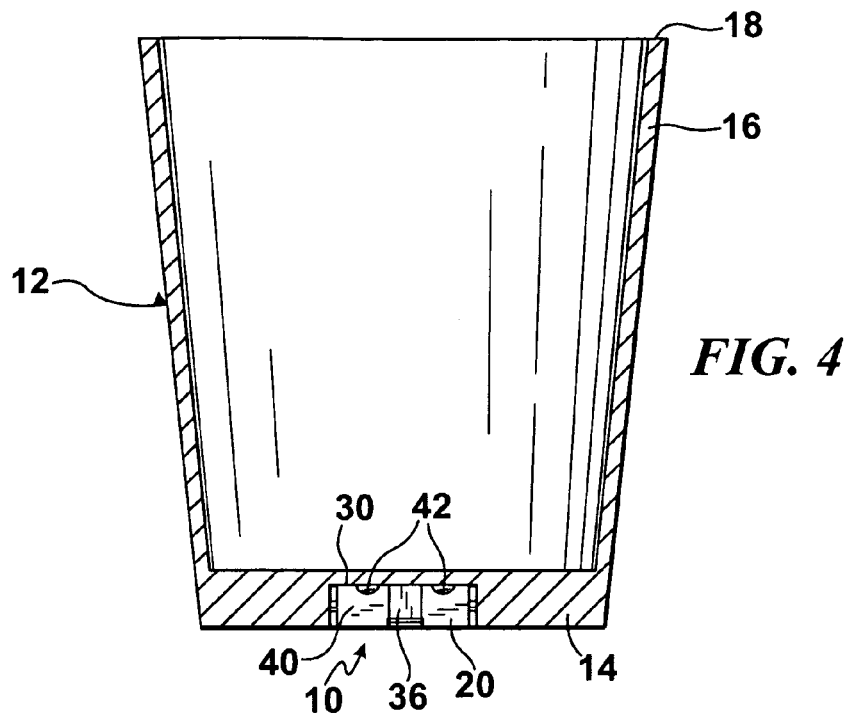
FIG. 4 is a diagrammatic cross sectional view taken on line 4-4 in FIG. 1.
Figure 6:
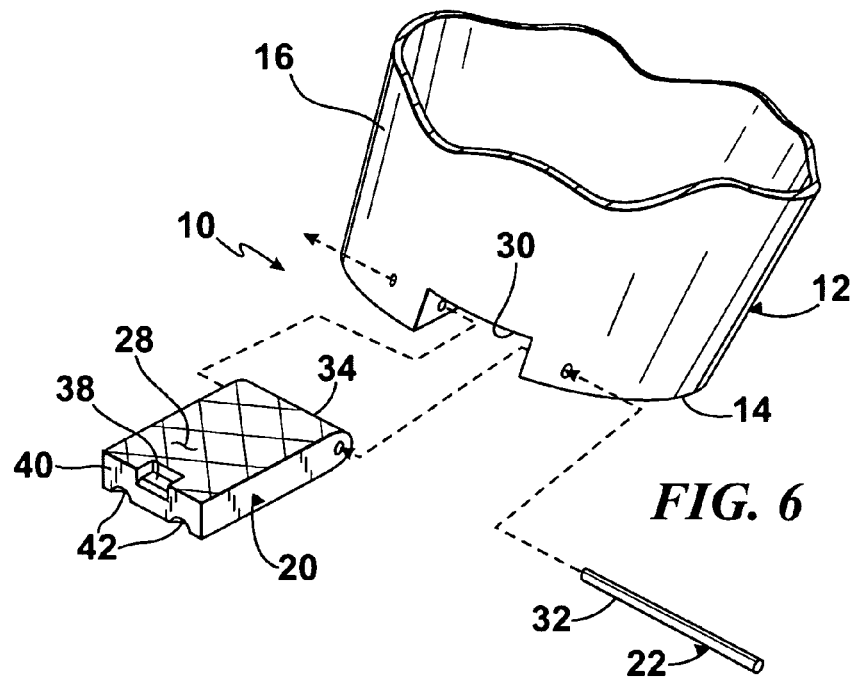
FIG. 6 is a diagrammatic exploded perspective view, of the area enclosed in the dotted circle indicated by arrow 6 in FIG. 1.
Figure 7:
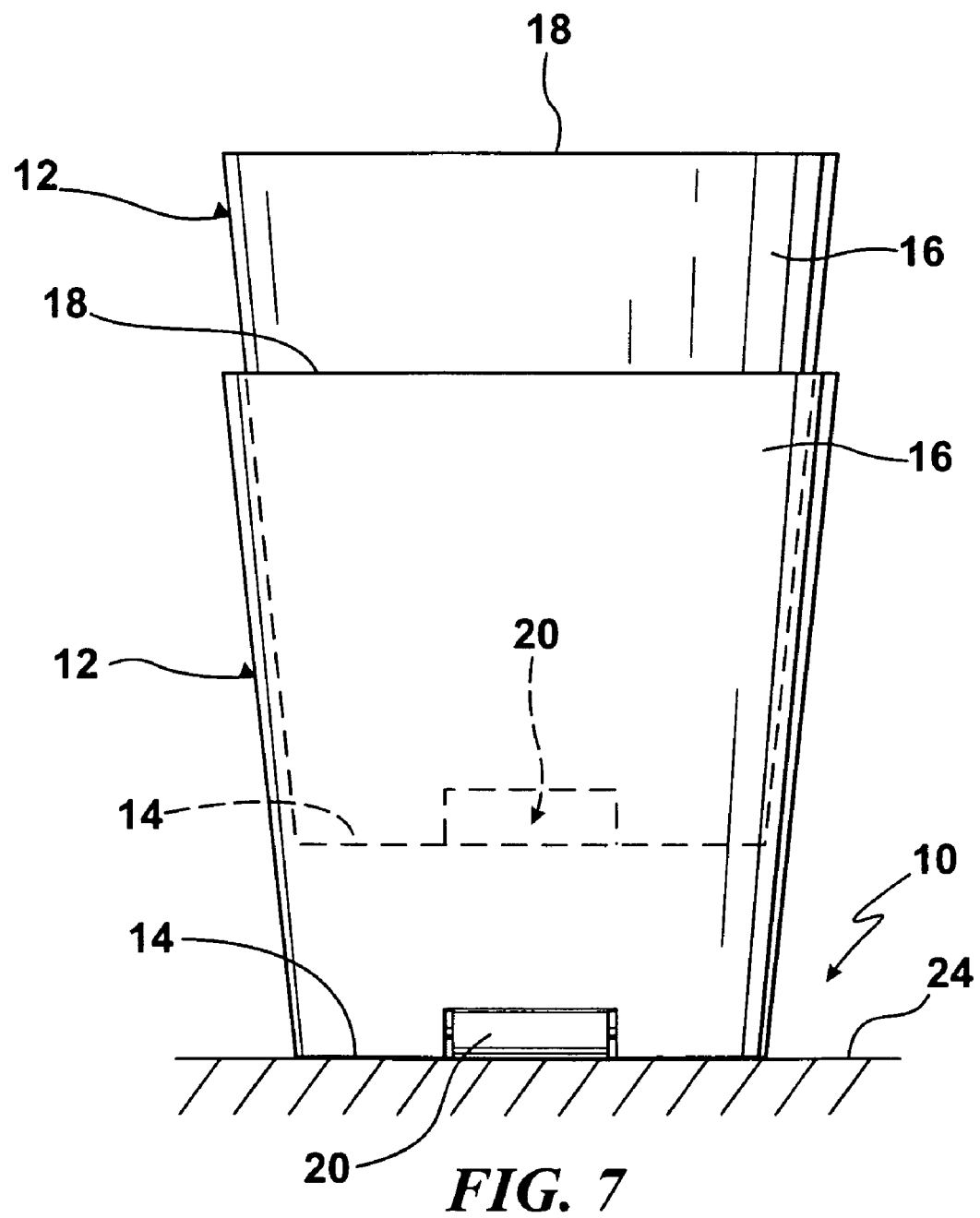
FIG. 7 is a diagrammatic elevational view showing two buckets stacked into one another.

| | |
|---|---|
| 10 | apparatus |
| 12 | stackable bucket of apparatus 10 |
| 14 | bottom wall of stackable bucket 12 |
| 16 | side wall of stackable bucket 12 |
| 18 | rim of side wall 16 |
| 20 | rectangular shaped footpad of apparatus 10 |
| 22 | pivotally securing mechanism of apparatus 10 |
| 24 | floor |
| 26 | person |
| 28 | friction surface on rectangular shaped footpad 20 |
| 29 | foot of person 26 |
| 30 | transverse slot in bottom wall 14 |
| 32 | elongated pivot rod of pivotally securing echanism 22 |
| 34 | curved first short end of rectangular shaped footpad 20 |
| 36 | flexible retainer clip of apparatus 10 |
| 38 | central notch in rectangular shaped footpad 20 |
| 40 | second short end of rectangular shaped footpad 20 |
| 42 | finger grip on second short end 40 |

DETAILED DESCRIPTION OF THE PREFERRED EMBODIMENT

Referring now to the figures, in which like numerals indicate like parts, and particularly to FIGS. 1 through 7, which are a diagrammatic perspective view of an embodiment of the present invention being utilized by a person mixing a product; a diagrammatic cross sectional view of the present invention per se taken on line 2-2 in FIG. 1, with the footpads folded inwardly; a diagrammatic bottom view taken in the direction of arrow 3 in FIG. 1, with one footpad folded inwardly; a diagrammatic cross sectional view taken on line 4-4 in FIG. 1; an enlarged diagrammatic cross sectional view of the area enclosed in the dotted circle indicated by arrow 5 in FIG. 2; a diagrammatic exploded perspective view, of the area enclosed in the dotted circle indicated by arrow 6 in FIG. 1; and a diagrammatic elevational view showing two buckets stacked into one another, and as such, will be discussed with reference thereto.

The present invention is an apparatus 10 for holding a stackable bucket 12 in place when mixing materials therein which comprises the stackable bucket 12 having a bottom wall 14 joined to a continuous tapered side wall 16 extending upwardly therefrom to form a rim 18 larger than the bottom wall 14. The stackable bucket 12 can be placed into another stackable bucket 12 for storage when not in use (see FIG. 7). A pair of rectangular shaped footpads 20 are provided.

A mechanism 22 is for pivotally securing each rectangular shaped footpad 20 into the bottom wall 14 of the stackable bucket 12 at an opposite side of the stackable bucket 12. When the rectangular shaped footpads 20 are pivoted outwardly away from opposite sides of the side wall 16 of the stackable bucket 12 and the bottom wall 14 of the stackable bucket 12 is placed upon a floor 24, a person 26 will stand upon the pair of rectangular shaped footpads 20 to prevent rotation of the stackable bucket 20 when mixing the materials within the stackable bucket 12 (see FIG. 1).

Each rectangular shaped footpad 20 comprises a friction surface 28 to prevent a foot 29 of the person 26 from slipping therefrom, when the rectangular shaped footpads 20 are extended outwardly from the stackable bucket 12. The pivotally securing mechanism 22 comprises the bottom wall 14 of the stackable bucket 12 having a transverse slot 30 thereacross, slightly wider than each rectangular shaped footpad 20. A pair of elongated pivot rods 32 are provided. Each elongated pivot rod 32 extends through one outer end of the bottom wall 14 of the stackable bucket 12 and through a curved first short end 34 of one rectangular shaped footpad 20 at an outer end of the transverse slot 30, thereby allowing the rectangular shaped footpad 20 to pivot between a stored position and an extended position.

The apparatus 10 further comprises a pair of flexible retainer clips 36 formed back to back and extending downwardly at center of the transverse slot 30 in the bottom wall 14 of the stackable bucket 12. Each rectangular shaped footpad 20 has a central notch 38 formed at a second short end 40 thereof to engage with one flexible retainer clip 36 when placed into the stored position. Each rectangular shaped footpad 20 has a pair of spaced apart finger grips 42 on opposite sides of the central notch 38 formed at the second short end 40 thereof. The person 26 can engage the finger grips 42 to release each rectangular shaped footpad 20 from the stored position to the extended position.

It will be understood that each of the elements described above, or two or more together, may also find a useful application in other types of constructions differing from the types described above.

While the invention has been illustrated and described as embodiments of an apparatus for holding a stackable bucket in place when mixing materials therein, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An apparatus for holding a stackable bucket in place when mixing materials therein which comprises:
   a) said stackable bucket having a bottom wall joined to a continuous tapered side wall extending upwardly therefrom to form a rim larger than said bottom wall, wherein said stackable bucket can be placed into another stackable bucket for storage when not in use;
   b) a pair of rectangular shaped footpads; and
   c) means for pivotally securing each said rectangular shaped footpad into said bottom wall of said stackable bucket at an opposite side of said stackable bucket, wherein when said rectangular shaped footpads are pivoted outwardly away from opposite sides of said side wall of said stackable bucket and said bottom wall of said stackable bucket is placed upon a floor a person will stand upon said air of rectangular shaped footpads to prevent rotation of said stackable bucket when mixing the materials within said stackable bucket, wherein each said rectangular shaped footpad comprises a friction surface to prevent a foot of the person from slipping therefrom, when said rectangular shaped footpads are extended outwardly from said stackable bucket, wherein said pivotally securing means comprises:
   d) said bottom wall of said stackable bucket having a transverse slot thereacross, slightly wider than each said rectangular shaped footpad; and
   e) a pair of elongated pivot rods wherein each said elongated pivot rod extends through one outer end of said bottom wall of said stackable bucket and through a curved first short end of one said rectangular shaped footpad at an outer end of said transverse slot, thereby allowing said rectangular shaped footpad to pivot between a stored position and an extended position, further comprising:
   f) pair of flexible retainer clips formed back to back and extending downwardly at center of said transverse slot in said bottom wall of said stackable bucket; and
   g) each said rectangular shaped footpad having a central notch formed at a second short end thereof to engage with one said flexible retainer clip when placed into the stored position.

2. The apparatus as recited in claim 1, further comprising each said rectangular shaped footpad having a pair of spaced apart finger grips on opposite sides of said central notch formed at the second short end thereof, wherein the person can engage said finger grips to release each said rectangular shaped footpad from the stored position to the extended position.

* * * * *